United States Patent [19]
Morinaga

[11] Patent Number: 5,416,478
[45] Date of Patent: May 16, 1995

[54] CAR NAVIGATION SYSTEM

[75] Inventor: Kenichi Morinaga, Daito, Japan

[73] Assignee: Funai Electric Co., Ltd., Daito, Japan

[21] Appl. No.: 28,418

[22] Filed: Mar. 9, 1993

[30] Foreign Application Priority Data

Mar. 12, 1992 [JP] Japan ................... 4-087455

[51] Int. Cl.⁶ ............................................. G08G 1/123
[52] U.S. Cl. ..................... 340/995; 340/988; 340/990; 364/449
[58] Field of Search ............ 340/995, 990, 988, 461, 340/705; 364/449; 73/178 R

[56] References Cited

U.S. PATENT DOCUMENTS

| | | | |
|---|---|---|---|
| 4,403,291 | 9/1983 | von Tomkewitsch | 340/995 |
| 4,782,447 | 11/1988 | Ueno et al. | 340/995 |
| 4,937,752 | 6/1990 | Nanba et al. | 340/995 |
| 5,043,902 | 8/1991 | Yokoyama et al. | 340/988 |
| 5,056,890 | 10/1991 | Iino et al. | 340/705 |
| 5,113,185 | 5/1992 | Ichikawa | 340/995 |
| 5,115,398 | 5/1992 | De Jong | 364/449 |
| 5,184,123 | 2/1993 | Bremer et al. | 340/988 |
| 5,189,430 | 2/1993 | Yano et al. | 340/995 |
| 5,214,425 | 5/1993 | Wreede | 340/461 |
| 5,293,163 | 3/1994 | Kakihara et al. | 340/995 |

*Primary Examiner*—Brent Swarthout
*Attorney, Agent, or Firm*—Lackenbach Siegel Marzullo Aronson & Greenspan

[57] ABSTRACT

A driver operates a car by watching an intersection number and an arrow which indicate direction by reflecting the information in the front windshield. The indicated arrow direction shows the direction in which the car is advancing. Accordingly, the driver does not need to observe the indicator displayed on the dashboard during operation and can drive more safely by concentrating his energy on operating the car. In the navigation system for cars, the advancing direction of the car at an intersection is previously designated by the driver, information regarding driving straight or turning is projected by a projector which includes an LCD or a fluorescent indicator tube whenever the car approaches the intersection based on the information, the above projected light is projected on a half-mirror provided at the front windshield of the car and an imaginary image is reflected before the front glass.

16 Claims, 3 Drawing Sheets

CAR NAVIGATION SYSTEM

BACKGROUND OF THE INVENTION

This invention relates to a navigation system for cars which provides an indication for guiding a car to a destination.

In the conventional navigation system generally used for cars, a liquid crystal display or a CRT (Cathode Ray Tube Display) is used as an indicator in which a map representing the car's present position is shown. Accordingly, the driver inputs the present position and the destination using a position input key such as a cursor key or the like while observing an indicator. Then, an internal arithmetic unit calculates the shortest course automatically and shows the course on the indicator. The driver can then manually change the course, partially or totally. In addition, a different course can also be selected from the first.

In this state, when the car starts, the arithmetic unit calculates the present position to indicate the position on the map. The driver observes the indication to drive the car toward the destination.

Further, roughly classified, there are two detecting means for detecting the above present driving position. One is to perform it with a direction sensor which detects the driving direction of the car and a distance sensor which detects the driving distance of the car. Another is to detect the driving position by receiving a signal from an artificial satellite by both sides of the car.

BRIEF DESCRIPTION OF THE INVENTION

The above indicator is generally positioned on the dashboard of the car. Whenever the car comes to an intersection, the driver observes the indicator to judge whether to go straight or to turn. This leads to inattentive driving during the driver's observation of the indicator. It is difficult to concentrate on driving while judging whether to continue driving straight or to turn. This is not, therefore, conducive to safe driving.

This invention is designed to solve such problems.

This invention relates to a navigation system for a car provided with a detecting means which detects the present position of the car, an arithmetic unit which calculates the present position based on this detecting means, an external storage which records map information, and an input unit which inputs the car's course, and an indicator which indicates the map and the position of the car, said navigation system being characterized in that a projecting device projects an imaginary image by projecting an indicating formation of the above indicator to a half mirror portion of the front windshield of the car.

The driver inputs the present position and the destination by aid of a position input key such as a cursor key, track ball, or a transparent touch panel piled up on a display of the indicator watching it wherein the map in which the present position is shown. An internal CPU (central processing unit) then automatically calculates the shortest course. Although the driver can change this course partially or totally manually, with respect to an intersection considered to be main, or an intersection at which the driver must turn, the driver designates the intersection with a position input key from the present position, inputs a number with a ten-key and designates driving direction with an indicating key which can be set for up to eight different directions.

When the car starts from this state, the arithmetic unit judges for every designated intersection whether to go straight or turn, based on the course information inputted before driving. The result is shown by light emitted as arrows which show a figure and the driving direction with a projection device constructed by LCD (liquid crystal display) or a fluorescent indicator tube whenever the car approaches a crossing, projects the light emission to a half mirror provided on the front windshield of the car, thereby projecting an imaginary image on the front windshield. The driver confirms with the arrows at every intersection to drive the car as indicated, whether going straight or turning.

Namely, the driver may drive the car simply by confirming the number of the intersection and the arrow which shows direction projected in front of the front windshield by the projecting device. The shown number of intersections shows the present car position and the directional arrow shows the direction in which the car is headed.

According to this invention then, since the driver is not required to watch an indicator on the dashboard while driving, more attentive driving is enabled. Further, there is no need to judge whether to go straight through an intersection or make a turn. In other words, the driver can concentrate his attention on operating the car so as to enable safer driving.

DETAILED DESCRIPTION OF THE INVENTION

An embodiment of this invention will be described as follows with reference to the drawings.

Figure 5:
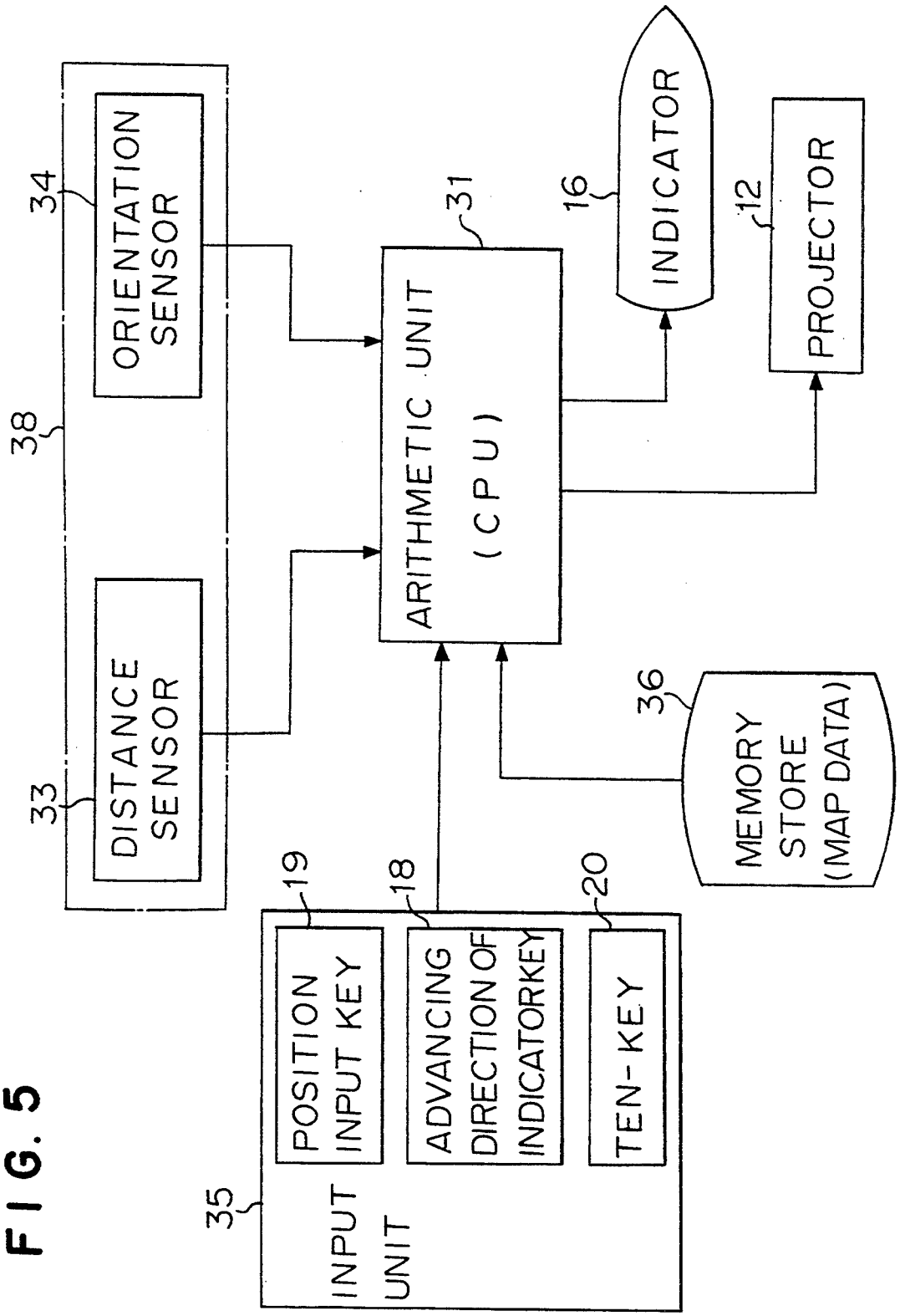
FIG. 5 is a block diagram showing of each device in the embodiment of this invention.

FIG. 5 is a block diagram which shows the connections of each device of the car navigation system. The function of each device will be described in order.

The numeral 38 is a present position detecting means which detects the present position of the car, 33 is a distance sensor which detects the driving distance of the car and 34 is an orientation sensor which detects the direction of advancement of the car.

The present position detecting means 38 is not limited to the sensors 33, 34. It is also possible to change a signal from an artificial satellite so as to receive the signal at both sides of the car.

The numeral 35 is an input unit consisting of a position input key 19 which uses a track ball which designates the crossing which passes the present position, destination and a half-way watching indicator 16 described hereafter; a ten-key pad 20 attached to a crossing number to the instructed crossing; and an advancing direction indicator key 18 which designates the direction of advancement at the crossing.

The numeral 36 is a memory store which memorizes maps, information, etc.

The numeral 31 is an arithmetic unit which operates based on the information from sensors 33, 34, information from the input unit and map information from the memory store to output necessary information to the indicator and the projector.

The numeral 16 is an indicator which indicates map information and the present position information from the arithmetic unit.

The numeral 12 is a projector which projects directional information from the arithmetic units onto the front windshield.

The operation of the embodiment is as follows.

Figure 3:
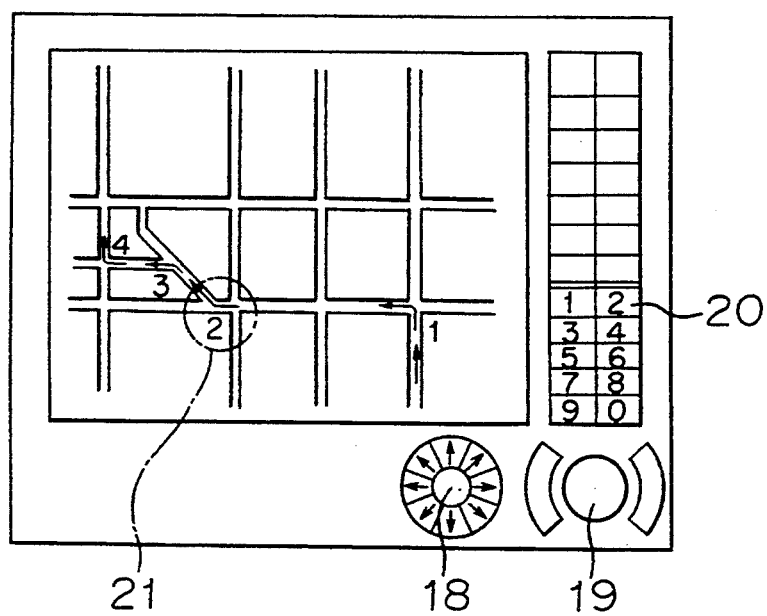
FIG. 3 is a drawing which shows an indicator and the input unit of a position arranged on the dashboard of the car in the embodiment of FIG. 1.

First, the driver inputs present position and the destination, using the position input key 19 which uses the track ball, watching the indicator 16 showing the map including the present position. Then the internal arithmetic unit 31 automatically calculates the shortest course as shown in the indicator 16 together with the map. Although the driver can change a part or all of the course manually, with respect to an intersection considered to be main, or an intersection at which the driver must turn, the driver designates the intersection with a position input key from the present position, inputs a number with the ten-key pad and designates a driving direction with an indicating key which can be set for up to eight different directions. After the completion of the above input, the indication thereof is shown as FIG. 3. The numeral 22 shown in the indicator at (21) designates the intersection number and the arrows on the roads of the map show directions where the car advances.

Figure 1:
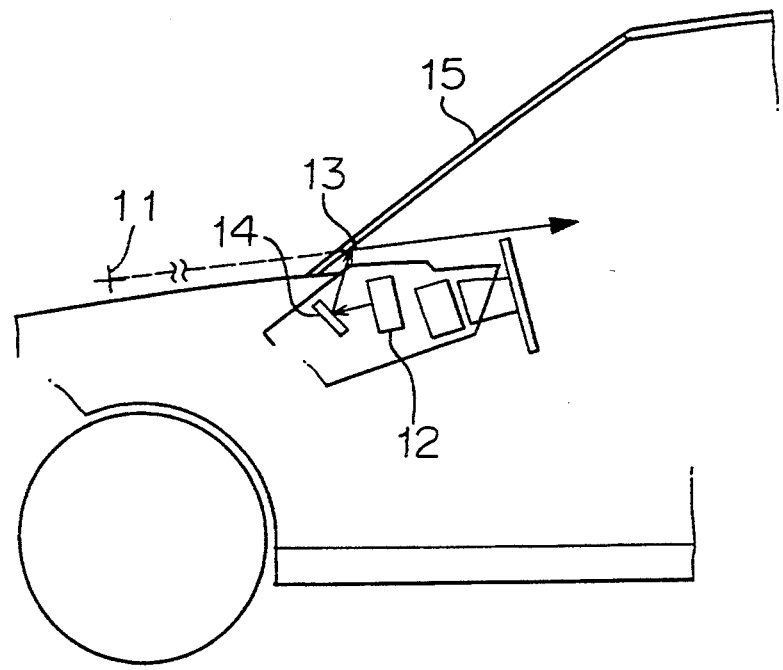
FIG. 1 is a side elevational drawing which shows a course until an imaginary image of the embodiment of this invention is reflected.
Figure 2:
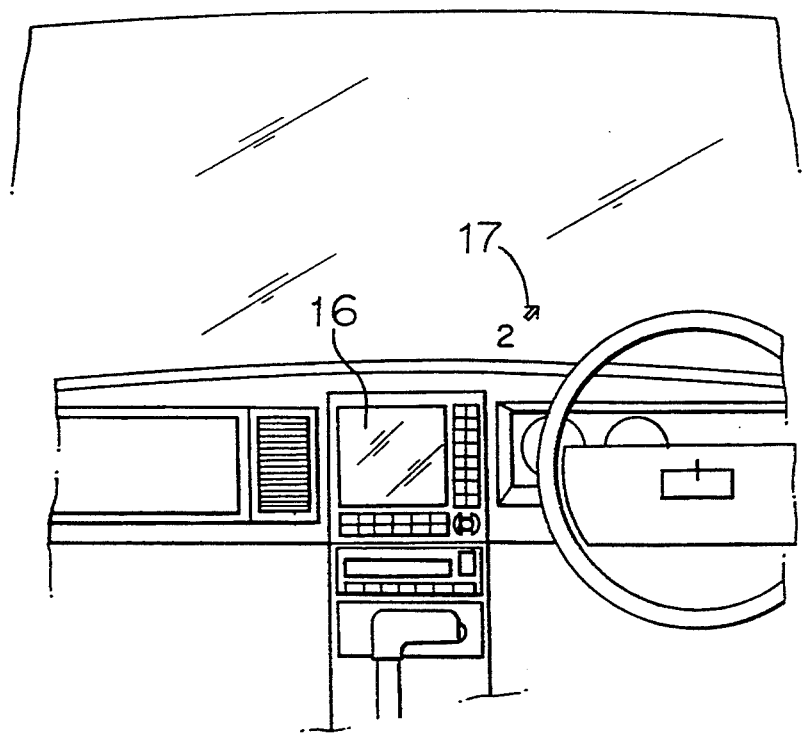
FIG. 2 is a side elevational drawing which shows a front condition observed from the position of the driver in the embodiment of FIG. 1.

When the car begins to run from this point, the arithmetic unit 31 judges whether a straight advancement or a turn must be made at the designated intersections whenever the car arrives at the crossing based on course information input before driving. As a result, a numeral and a directional arrow located in the dashboard of the car is light-emitted every time the car approaches an intersection. As shown in FIG. 1 and FIG. 2, the luminescence is once reflected by a mirror 14, projected to a half mirror 13 provided at the windshield 15 of the car thereby observing an imaginary image 11 in front of the windshield.

Figure 4:
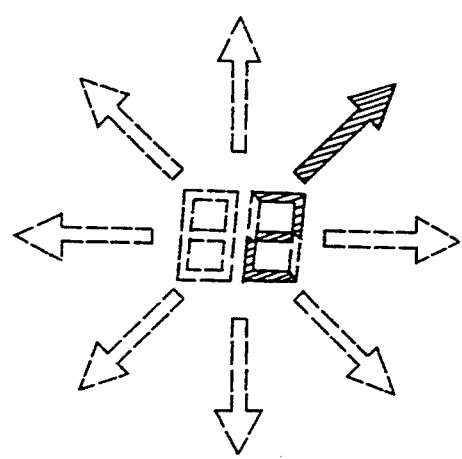
FIG. 4 is an arranged drawing of a LCD or a fluorescent indicator tube included in a projector of the embodiment in FIG. 1.

The driver may operate the car by watching the number of the intersection and its advancing direction shown by arrow 17 projected in front of the windshield 15 by the projector whenever the car approaches a designated intersection. The designated intersection number shows the position of the intersection where the car passes and the direction shown by the arrow indicates the direction in which the car advances. As an example thereof, FIG. 4 is a figure which shows the luminescence of the projector 12 when the car approaches the crossing number 22.

According to this invention, the driver is, as described above, not required to watch the indicator 16 on the dashboard while driving. Further, there is no necessity make a judgment as to whether to go straight or make a turn at the intersection. In other words, the driver can concentrate his energy on driving and on the safe operation of the car.

Further, as applications of the above embodiments, the following constructions can be considered:

(1) A system wherein the driver can choose how many meters before an intersection the projection of the directional arrow should be displayed.

(2) A system wherein the driver can choose, in consideration of the car speed, how many seconds before an intersection the projection of the directional arrow should be displayed.

(3) A system wherein the driver's attention is caught by the change in projected arrow length as the car approaches an intersection after the initiation of the projection of the arrow.

(4) A system wherein the driver's attention is caught by the change in color of the projected arrow as the car approaches an intersection after the initiation of the projection of the arrow.

(5) A system wherein the driver is urged to attention by the change in position of a projected imaginary image as the car approaches the intersection after the initiation of the projection of the arrow.

The number of deaths caused by traffic accidents, which at one time was decreasing, has recently been increasing again. The elimination of traffic accidents is the most important concern in traffic policies. The conventional navigation system is a convenient one, but fosters inattentive driving. However, by using the device of this invention, the driver may operate a car by watching the intersection number that appears in front of the windshield at every intersection and the direction shown by arrow even if the driver does not know the road conditions or have directions. As a result, the driver can concentrate his energy on the operation and safe driving of the car.

What I claim is:

1. In a navigation system for a car provided with a detecting means of the present position of the car, an arithmetic unit which calculates the present position of the car based on the above detecting means, an external storage which records map information, an input unit which inputs a course where the car passes and a destination, and an indicator, which displays a map and the driving locus, said navigation system for the car being provided with a projector which projects an image including a directional arrow of related display information of the indicator on a half-mirror portion of the front windshield of the car, the car navigation system arithmetic unit calculating the shortest course from the location of the car, to the input destination with said arithmetic unit thereby indicating the shortest course thereof on said indicator, the directional arrow length of said image projected by the indicator changing with a lapse of time.

2. A car navigation system according to claim 1, wherein a time period of light emission of said projected image is selectively set by a distance from the position of the car to an intersection by said input unit.

3. A car navigation system according to claim 1, wherein a light emission time of said image is selectively set by the time from a present point of time to a time for reaching an intersection by said input unit using the speed at a present point as a parameter.

4. A car navigation system according to claim 1, wherein an arrow of the image projected by the indicator changes its color according to an access to an intersection.

5. A car navigation system according to claim 1, wherein an arrow of the image projected by the indicator changes its position in the image thereof according to the access to an intersection.

6. A car navigation system according to claim 1, wherein an inputted course and an alternative course thereof are indicated by the navigation system.

7. In a navigation system for a car provided with a detecting means for detecting a current position and orientation of a car, an arithmetic unit which calculates the current positions of the car based on information from the detecting means, memory means for recording map information, an input unit which inputs a course where the car passes and a destination, and an indicator which displays a map and the driving locus of the car, said navigation system further comprising projecting means for projecting an image of selected display information related to the map and driving locus of the car, including a directional arrow, on a half-mirror portion of the front windshield of the car, the selected display information being less than that shown on said indicator to minimize distraction of the driver while assisting the driver to navigate the car in accordance with programmed directions, the car navigation system arithmetic unit calculating the shortest course from the location of the car to the input destination with said arithmetic unit thereby indicating the shortest course thereof on said indicator, the directional arrow length of said image projected by the projecting means changing with a lapse of time.

8. In a navigation system for a car according to claim 7, wherein the selected display information comprises a directional arrow pointing in the direction in which the car is to be turned at a given point of the locus of the car.

9. In a navigation system for a car according to claim 8, wherein said arrow is one of a plurality of preset radial arrows emanating from a central region and angularly offset from each other.

10. In a navigation system for a car according to claim 9, wherein eight arrows are provided.

11. In a navigation system for a car according to claim 9, wherein the selected display information also includes an indicia which also appears on the map display on said indicator to correlate the projected turning directions with specific points on the driving locus of the car.

12. A method of providing navigational information for driving a car comprising the steps of detecting a current position and orientation of a car;
calculating the current position of the car based on information obtained from said detecting step with an arithmetic unit;
recording map information;
inputting a course where the car passed and a destination;
displaying a map and driving locus of the car;
projecting an image of selected display information related to the map and driving locus of the car on a half-mirror portion of the front windshield of the car, including a directional arrow the selected display information being less than that shown on an indicator to minimize distraction of the driver while assisting the driver to navigate the car in accordance with programmed directions; calculating the shortest course from the location of the car to the input destination with said arithmetic unit thereby indicating the shortest course thereof on said indicator; and selectively changing the directional arrow length of said image projected by the projecting step with a lapse of time.

13. Method according to claim 12, wherein said projecting step comprises projecting a directional arrow pointing in the direction in which the car is to be turned at a given point of the locus of the car.

14. Method according to claim 13, wherein said arrow is one of a plurality of preset radial arrows emanating from a central region and angularly offset from each other.

15. Method according to claim 14, wherein eight arrows are provided.

16. Method according to claim 14, wherein said projecting step comprises projecting an indicia which also appears on the map display on said indicator to correlate the projected turning directions with specific points on the driving locus of the car.

* * * * *